United States Patent Office 3,787,530
Patented Jan. 22, 1974

3,787,530
CRYSTAL-CLEAR THERMOPLASTIC MOULDING COMPOSITIONS OF LINEAR POLYESTER AND STYRENE-ACRYLONITRILIC COPOLYMER MIXTURES
Lothar Bohn, Glashutten, Taunus, Harald Cherdron, Naurod, Taunus, Manfred Fleissner, Niederhochstadt, Taunus, and Walter Herwig, Frankfurt am Main, Germany, assignors to Farbwerke Hoechst Aktiengesellschaft vormals Meister Lucius & Bruning, Frankfurt am Main, Germany
No Drawing. Filed Feb. 28, 1972, Ser. No. 230,097
Claims priority, application Germany, Mar. 1, 1971,
P 21 09 560.3
Int. Cl. C08g 39/10
U.S. Cl. 260—873                    10 Claims

ABSTRACT OF THE DISCLOSURE

Crystal-clear thermoplastic moulding compositions consisting of a mixture of linear saturated polyesters, the diol component of which consists of ethylene glycol and a diol of the formula HO—$CH_2$—$CR_1R_2$—$CH_2$—OH, wherein $R_1$ represents a hydrogen atom or a linear or branched aliphatic radical having up to 4 carbon atoms, and $R_2$ represents a linear or branched aliphatic radical having up to 4 carbon atoms, and of a styrene/acrylonitrile copolymer. From these crystal-clear thermoplastic moulding compositions, shaped articles having a high transparency and a high gloss can be manufactured, in particular according to the injection-moulding process. Owing to their good mould release properties, their excellent dimensional stability, as well as their high impact strength, together with favourable hardness values, the moulding compositions are particularly suitable for the manufacture of high-quality shaped articles.

---

The present invention relates to crystal-clear thermoplastic moulding compositions.

It has been proposed to process linear saturated polyesters on the basis of aromatic dicarboxylic acids and aliphatic diols into shaped articles. It has also been known that by modifying the diol component, it becomes possible to prepare amorphous, transparent and colourless compositions, which can be processed, by means of the injection moulding process, to give crystal-clear shaped articles having a particularly high impact strength besides a high surface gloss. However, a disadvantage of these shaped articles is to be seen in their inferior hardness, so that they cannot be used for many application purposes in the technical field.

The present invention provides transparent moulding compositions which can be processed into shaped articles combining a high impact strength with a good hardness.

These crystal-clear thermoplastic moulding compositions consist of a mixture of from 95 to 40% by weight, preferably from 90 to 60% by weight, of a linear saturated polyester of aromatic dicarboxylic acids and diols, wherein the aromatic dicarboxylic acids optionally contain a small amount of aliphatic dicarboxylic acids, and the diols consist of from 65 to 98% by weight, preferably from 75 to 92% by weight, of ethylene glycol and of from 2 to 35% by weight, preferably from 8 to 25% by weight, calculated on the total amount of the diols, of a diol of the formula HO—$CH_2$—$CR_1R_2$—$CH_2$—OH, wherein $R_1$ stands for a hydrogen atom or a linear or branched aliphatic radical having up to 4 carbon atoms, and $R_2$ represents a linear or branched aliphatic radical having up to 4 carbon atoms, and from 5 to 60% by weight, preferably from 10 to 40% by weight, of a copolymer consisting of from 92.5 to 77% by weight, preferably from 92 to 78.5% by weight, of styrene and from 7.5 to 23% by weight, preferably from 8 to 21.5% by weight, of acrylonitrile.

The moulding compositions of the invention can be injection-moulded to shaped articles having a high transparency, a high gloss, as well as an excellent dimensional stability. Surprisingly, they have good mould release properties, even though no wax is used, and a high impact strength, together with good hardness values.

The moulding compositions are prepared by intensely mixing polyesters and styrene/acrylonitrile copolymers in the molten state. The mixing time is in the range of from 0.5 to 15 minutes, preferably from 1 to 5 minutes. In order to mix the polyester with the copolymer, use is made preferably of an extruder. It is also possible to mix the starting polymers in the form of a powder or of granules, and to introduce them directly into an injection-moulding machine. However, the former process ensures a more regular distribution of the two components in the shaped article.

As linear saturated polyester of aromatic dicarboxylic acids, there is used preferably polyethylene terephthalate modified by means of diols of the formula specified above; a particular advantageous modification is obtained by 2,2-dimethyl-propanediol-1,3, in an amount of from 2 to 7% by weight, calculated on the polyester used. Besides terephthalic acid, there may also be used other aromatic or aliphatic dicarboxylic acids in an amount of up to 5 mol percent, calculated on the dicarboxylic acids used; there may be mentioned, for example, isophthalic acid, naphthalene-2,6-dicarboxylic acid, or adipic acid. Mixtures of polyesters may also be used.

The polyesters used for the preparation of the moulding compositions of the invention have preferably a reduced specific viscosity dl./g. (measured with a 1% solution in phenol/tetrachlorethane 60:40 at 25° C.) of from 0.6 to 2.0, preferably from 1.0 to 1.6.

As styrene/acrylonitrile copolymers there are used linear polymers, the acrylonitrile content of which is in the range specified above. They have advantageously a reduced specific viscosity dl./g. (measured with a 1% solution in phenol/tetrachlorethane 60:40 at 25° C.) of from 1.0 to 3.0, preferably from 1.5 to 2.5.

The moulding compositions of the invention have a reduced specific viscosity (measured as above) of more than 0.9 dl./g., and they should contain a minimum amount of moisture, preferably less than 0.02% by weight.

The moulding compositions of the invention are suitable in particular for the manufacture of high-quality shaped articles, such as disk cams, coupling rings, tubes, hollow articles, profiles, lenses in breathing masks and diving helmets, and other items.

The following examples serve to illustrate the invention.

EXAMPLE 1

4.5 kg. of polyethylene terephthalate containing 4.0% by weight, calculated on the polyester, of 2,2-dimethyl-1,3-propanediol and having a reduced specific viscosity of 1.58 dl./g. (measured with a 1% solution in phenol/tetrachlorethane 60:40 at 25° C.) were intensely mixed with 1.5 kg. of styrene copolymer containing 14% by weight of acrylonitrile and having a reduced specific viscosity of 1.9 dl./g. (measured as above) in a rotating vessel, with the exclusion of moisture; subsequently the mixture was melted in an extruder, and was then homogenized and granulated. The granules were dried at a temperature of from 80 to 100° C. and a pressure of 0.4 mm. of mercury. They had a reduced specific viscosity of 1.52 dl./g. Of the material, sheets having the measurements of 60x60x2 mm. and proportional rods of the sample form 2 (ratio of 1:⅓), by analogy with DIN 53455 (German Industrial Standard), were manufactured by injection-moulding.

EXAMPLES 2–5

In a manner analogous to Example 1, mixtures were prepared on the basis of the same starting components, and were then injection-moulded.

The values measured can be seen from the following table.

| Ex. | Percent of styrene copolymer | Reduced specific viscosity (dl./g.) of the test article | Ball indentation hardness,[1] kg./cm.[2] | Tensile stress[2] at yield, kg./cm.[2] | Impact strength,[3] cm. |
|---|---|---|---|---|---|
| 2 | 10 | 1.36 | 1,320 | 650 | 120 |
| 3 | 18 | 1.42 | 1,380 | 680 | 100 |
| 1 | 25 | 1.46 | 1,435 | 710 | 80 |
| 4 | 30 | 1.51 | 1,450 | 730 | 70 |
| 5 | 35 | 1.51 | 1,460 | 740 | 60 |

[1] Measured according to DIN 53456.
[2] Measured according to DIN 53455.
[3] The impact strength of the injection-moulded sheets was tested by means of a drop hammer test. The test sheets were exposed to an impact stress in a way that a drop hammer having a weight of 500 g., the head being in the form of a hemisphere (10 mm. radius), was dropped vertically onto the sheets. The table indicates the height of fall in cm., at which 90% of the sheets did not break.

What is claimed is:

1. Thermoplastic moulding compositions of a reduced specific viscosity of more than 0.9 dl./g. measured with a 1% solution in phenol/tetrachlorethane in a ratio of 60:40, respectively, at 25° C. and a minimum moisure of less than 0.02% by weight consisting essentially of a mixture of
   (a) from 95 to 40% by weight of a linear saturated polyester of aromatic dicarboxylic acids and diols, wherein the aromatic dicarboxylic acids optionally contain up to 5 mol percent of aliphatic dicarboxylic acids, and the diols consist of from 65 to 98% by weight of ethylene glycol and from 2 to 35% by weight, calculated on the total amount of diols, of a diol having the formula $$HO-CH_2-CR_1R_2-CH_2-OH,$$

wherein $R_1$ represents a hydrogen atom or a linear or branched aliphatic radical having up to 4 carbon atoms, and $R_2$ stands for a linear or branched aliphatic radical having up to 4 carbon atoms, and
   (b) from 5 to 60% by weight of a copolymer consisting essentially of from 92.5 to 77% by weight of styrene and from 7.5 to 23% by weight, calculated on the copolymer, of acrylonitrile.

2. Thermoplastic moulding composition as claimed in claim 1, wherein the aromatic dicarboxylic acid component of the linear saturated polyester is terephthalic acid.

3. Thermoplastic moulding composition as claimed in claim 1, wherein the acid component of the linear saturated polyester is terephthalic acid, and wherein the diol component of the polyester contains, besides ethylene glycol, from 2 to 7% by weight, calculated on the polyethylene terephthalate, of 2,2-dimethyl-1,3-propanediol.

4. Thermoplastic moulding composition as claimed in claim 1, wherein the modified linear saturated polyester contains, besides terephthalic acid, up to 5 mol percent, calculated on the dicarboxylic acid used, of other aromatic or aliphatic dicarboxylic acids.

5. Thermoplastic moulding composition as claimed in claim 1, wherein the modified linear saturated polyester contains, besides terephthalic acid, up to 5 mol percent, calculated on the dicarboxylic acid used, of naphthalene-2,6-dicarboxylic acid, isophthalic acid, or adipic acid.

6. Thermoplastic moulding composition as claimed in claim 1, wherein the linear saturated polyester has a reduced specific viscosity (measured with a 1% solution in phenol/tetrachlorethane 60:40 at 25° C.) in the range of from 0.6 to 2.0 dl./g.

7. Thermoplastic moulding composition as claimed in claim 1, wherein the linear saturated polyester has a reduced specific viscosity in the range of from 1.0 to 1.6 dl./g.

8. Thermoplastic moulding composition as claimed in claim 1, wherein the styrene/acrylonitrile copolymer has a reduced specific viscosity (measured with a 1% solution in phenol/tetrachlorethane 60:40 at 25° C.) in the range of from 1.0 to 3.0 dl./g.

9. Thermoplastic moulding composition as claimed in claim 1, wherein the styrene/acrylonitrile copolymer has a reduced specific viscosity in the range of from 1.5 to 2.5 dl./g.

10. Injection-moulded articles manufactured from the thermoplastic moulding compositions as claimed in claim 1.

References Cited
UNITED STATES PATENTS 3,498,952  3/1970  Wiener _____ 260—75
3,592,876  7/1971  Brinkmann et al. ____ 260—873

OTHER REFERENCES

Chem. Absts. vol. 72: 112, 296u, "Transparent Thermoplastic Polyester Molding Compositions," Farbwerke.

WILLIAM H. SHORT, Primary Examiner

E. WOODBERRY, Assistant Examiner

U.S. Cl. X.R.

260—75 R